United States Patent
Elms et al.

(10) Patent No.: US 7,149,066 B2
(45) Date of Patent: Dec. 12, 2006

(54) FAULT DETECTOR FOR TWO LINE POWER DISTRIBUTION SYSTEM AND PROTECTION APPARATUS INCORPORATING THE SAME

(75) Inventors: Robert T. Elms, Monroeville, PA (US); Thomas E. Natili, Butler, PA (US)

(73) Assignee: Eaton Corporation, Cleveland, OH (US)

( * ) Notice: Subject to any disclaimer, the term of this patent is extended or adjusted under 35 U.S.C. 154(b) by 609 days.

(21) Appl. No.: 10/680,819

(22) Filed: Oct. 7, 2003

(65) Prior Publication Data

US 2005/0073780 A1    Apr. 7, 2005

(51) Int. Cl.
    *H02H 3/00*        (2006.01)
(52) U.S. Cl. ....................................... 361/47
(58) Field of Classification Search ............... 361/47
     See application file for complete search history.

(56) References Cited

U.S. PATENT DOCUMENTS

| | | | |
|---|---|---|---|
| 3,895,263 A * | 7/1975 | Clark | 361/46 |
| 3,944,888 A * | 3/1976 | Clark | 361/46 |
| 4,208,688 A * | 6/1980 | Misencik et al. | 361/46 |
| 5,453,723 A | 9/1995 | Fello et al. | |
| 5,459,630 A | 10/1995 | MacKenzie et al. | |
| 5,565,833 A | 10/1996 | Leet et al. | |
| 5,805,398 A | 9/1998 | Rae | |
| 5,889,643 A | 3/1999 | Elms | |
| 5,892,420 A | 4/1999 | Larranaga et al. | |
| 5,896,262 A | 4/1999 | Rae et al. | |
| 6,014,297 A | 1/2000 | Clarey et al. | |
| 6,031,699 A * | 2/2000 | Dollar et al. | 361/42 |
| 6,057,997 A | 5/2000 | Mackenzie et al. | |
| 6,388,849 B1 | 5/2002 | Rae | |

* cited by examiner

*Primary Examiner*—Ronald W. Leja
(74) *Attorney, Agent, or Firm*—Martin J. Moran

(57) ABSTRACT

Apparatus for protecting a two-line electric power distribution system includes a circuit breaker pole in each line. Each pole includes a fault detector generating a fault signal in response to either an arc fault or a ground fault in the protected line, and a trip unit responsive to the fault signal. Each trip unit includes a trip coil and an SCR connected in series at a node with the trip coil connected to the neutral conductor and the SCR connected to the associated line conductor. A jumper connects the two nodes together directly without electrical isolation so that a fault signal from either detector energizes both trip coils to open both poles in response to an arc fault or a ground fault in either line, even if one of the line conductors is not energized.

13 Claims, 1 Drawing Sheet

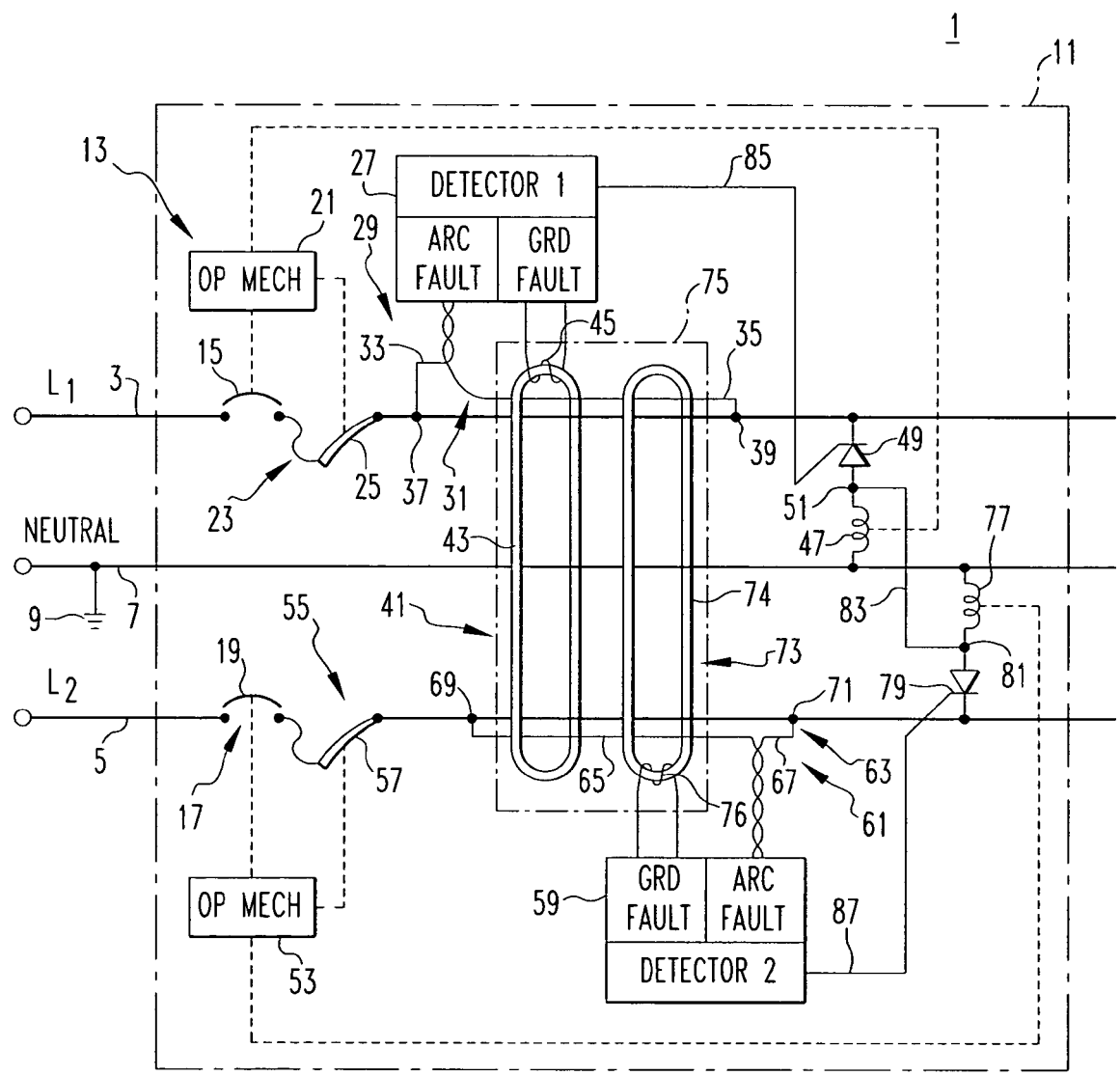

FAULT DETECTOR FOR TWO LINE POWER DISTRIBUTION SYSTEM AND PROTECTION APPARATUS INCORPORATING THE SAME

BACKGROUND OF THE INVENTION

1. Field of the Invention

This invention relates to apparatus providing protection from faults, including arc faults and ground faults, in two line electric power distribution systems, and particularly to apparatus that trips circuit breaker poles in both lines in response to an arc fault or ground fault in either line.

2. Background Information

Branch circuits in electric power distribution systems often share a common neutral conductor to reduce the wiring required. Such multi-wire branch circuits are often referred to as "home runs". Home runs are only permitted under certain conditions. Generally, they are permitted as long as the two line conductors are energized by separate phases or by a center tapped single phase to avoid overloading the neutral conductor, and as long as all ungrounded conductors are disconnected simultaneously at the panel board where the branch circuits originate. This simultaneous disconnection of the ungrounded conductors can be accomplished with a two pole disconnect, two single pole circuit breakers with a handle tie, or a two pole circuit breaker.

Typically, such multi-wire branch circuits are provided with short circuit and overload protection by the tied single pole breakers or the two pole breaker. Only the two pole breaker can also provide ground fault protection by the addition of a common ground fault detector. Recently, there has been an increased interest in providing protection from arc faults. Arc faults are intermittent high impedance faults which can be caused for instance, by worn insulation, loose connections, broken conductors, and the like. Because of their intermittent and high impedance nature, they do not generate currents of sufficient instantaneous magnitude or sufficient average current to trigger the thermal-magnetic trip device that provides the short circuit and overload protection.

U.S. Pat. No. 5,896,262 discloses apparatus for detecting faults in multi-wire branch circuits where both poles are tripped simultaneously in response to all faults, overcurrent, arcing and ground faults, regardless of which line conductor is involved. The thermal-magnetic devices of the two poles are mechanically interconnected so that when one pole trips the other is also tripped. A common trip coil is energized by either of separate arc fault detectors associated with the two circuit breaker poles or by a common ground fault circuit. As each of the arc fault circuits is referenced to an associated line conductor and the single ground fault circuit is referenced to neutral, the arc fault trip signals are isolated by opto-isolators from the electronic switch that turns on the coil.

The arrangement of U.S. Pat. No. 5,889,643 complies with the general conditions for a multi-wire branch circuit discussed above where all ungrounded conductors must be opened simultaneously. This is because the two line conductors can be connected to a single appliance, such as an electric stove, for instance, to provide 220 volts, or to two separate outlets in a common receptacle. However, where the two line conductors with the common neutral, are connected to independent loads, both circuits do not have to be interrupted simultaneously in response to an overcurrent condition (a short circuit or overload) in one line conductor. By only interrupting current in the affected line conductor disruption of service is minimized. On the other hand, an arcing fault occurs because of a wiring failure. This wiring may be in the multi-wire cable, and therefore, both poles should be tripped. U.S. Pat. No. 6,014,297 is directed to apparatus which is adapted to this situation. The thermal-magnetic trip devices are not mechanically coupled so that an overload or short circuit will only open the affected line conductor. Both circuit breaker poles are opened in response to an arc fault or ground fault by separate coils that actuate the breaker pole associated with each of the line conductors. Thus, detection of an arc fault by either arc fault circuit or the single ground fault circuit results in energization of both trip coils. However, again, as the arc fault circuits are separately referenced to the two line conductors and the ground fault circuit is referenced to the neutral conductor, opto-isolators are needed to electrically isolate the trip signals.

While the apparatus of U.S. Pat. Nos. 5,889,643 and 6,014,297 perform their intended functions, there is room for improvement in protection in multi-wire branch circuits.

SUMMARY OF THE INVENTION

The invention is directed to apparatus for protecting an electric power distribution system that has a first line conductor, a second line conductor and a common neutral conductor. The apparatus comprises a first circuit breaker pole comprising first separable contacts connected in the first line conductor, a first arc fault detector generating a first fault signal in response to arc fault currents in the first line conductor, and a first trip unit comprising a first trip coil and a first unidirectional switch connected in series at a first node. The first trip coil is connected to the common neutral conductor and the first unidirectional switch is connected to the first line conductor. The first unidirectional switch is turned on by the first fault signal to energize the first trip coil and open the first separable contacts. The apparatus further includes a second circuit breaker pole comprising second separable contacts connected in the second line conductor, a second arc fault detector generating a second fault signal in response to arc fault currents in the second line conductor, and a second trip unit comprising a second trip coil and a second unidirectional switch connected in series at a second node. The second trip coil is connected to the common neutral conductor and the second unidirectional switch is connected to the second line conductor. The second unidirectional switch is turned on by the second fault signal to energize the second trip coil and open the separable contacts. The apparatus also includes a jumper connected at a first end to the first node and at a second end to the second node to directly connect the first and second nodes without electrical isolation and so that turn on of either one or both of the first unidirectional switch and the second unidirectional switch energizes both the first trip coil and the second trip coil to open both the first and second separable contacts. The unidirectional switches can be silicon controlled rectifiers.

The apparatus of the invention can further comprise a first ground fault detector generating the first fault signal to turn on the first unidirectional switch in response to a ground fault in an electric power distribution system. Similarly, the second circuit breaker pole can comprise a second ground fault detector generating a second fault signal to turn on the second unidirectional switch in response to a ground fault.

The first ground fault detector can comprise a first sensing coil through which the first line conductor, the second line conductor and the common neutral conductor are all routed. The second ground fault detector can comprise a second sensing coil through which the three conductors of the electric power distribution system are also routed. The first and second sensing coils can be wound on a common core that can be an air core.

The first arc fault detector can comprise a pair of first sensing wires connected at spaced points on the first line conductor with one of the first sensing wires extending through the sensing coils. In this arrangement, the second arc fault detector can comprise a pair of second sensing wires connected at spaced points on the second line conductor with one of the second wires extending through the sensing coils.

The invention is also directed to a fault detector for an electrical power distribution system having a first line conductor, a second line conductor and a common neutral conductor. The fault detector comprises a first detector comprising a first arc current sensor sensing arc currents in the first line conductor, a first ground current sensor comprising a first sensing coil through which the first, second and neutral conductors are routed, a first detector circuit responsive to arc currents from the first arc current sensors and to ground currents from the first ground current sensor to generate a first fault signal, and a first trip circuit comprising a first trip coil and a first unidirectional switch connected in series at a first node, with the first trip coil connected to the common neutral conductor and the first unidirectional switch connected to the first line conductor. The first unidirectional switch is turned on by the first fault signal to energize the first trip coil.

The fault detector also comprises a second detector that comprises a second arc current sensor sensing arc currents in the second line conductor, a second ground current sensor comprising a second sensing coil through which the first, second and common neutral conductors are routed, a second detector circuit responsive to arc currents from the second arc current sensor and to ground currents from the second ground current sensor to generate a second arc fault signal, and a second trip circuit comprising a second trip coil and a second unidirectional switch connected in series at a second node with the second trip coil connected to the common neutral conductor and the second unidirectional switch connected to the second line conductor. The second unidirectional switch is turned on by the second fault signal to energize the second trip coil. This fault detector further comprises a jumper connected at a first end to the first node and at a second end to the second node to directly connect the first and second nodes without electrical isolation and so that turn on of either or both unidirectional switches energizes both the first and second trip coils.

In this fault detector, the first arc current sensor can comprise a first pair of sensing wires connected to first spaced apart points on the first line conductor with one of the first pair of sensing wires extending through the first sensing coil. The second arc current sensor can comprise a second pair of sensing wires connected to spaced apart points on the second line conductor with one of the second pair of sensing wires extending through the second sensing coil. The first and second sensing coils can have a common core that can be an air core. Also, the unidirectional switch can be a silicon controlled rectifier.

BRIEF DESCRIPTION OF THE DRAWINGS

A full understanding of the invention can be gained from the following description of the preferred embodiments when read in conjunction with the accompanying drawing in which The FIGURE is a schematic circuit diagram illustrating apparatus in accordance with the invention applied to a two line electric power distribution system.

DESCRIPTION OF THE PREFERRED EMBODIMENTS

The FIGURE illustrates a two line electric power distribution system 1 to which the invention has been applied. This power distribution system 1 includes a first line conductor 3, a second line conductor 5 and a common neutral conductor 7. The common neutral conductor 7 can be connected to ground at 9, typically for instance, at the entrance to a customer's facility or residence. A circuit breaker 11 includes a first circuit breaker pole 13 having first separable contacts 15 connected in the first line conductor 3 and a second pole 17 having second separable contacts 19 connected in the second line conductor 5.

The first circuit breaker pole 13 has an operating mechanism 21 for opening and closing the first separable contacts 15. This can be performed manually by a handle (not shown) as is well known. In addition, the first pole 13 includes a first trip unit 23 that actuates the operating mechanism to open the separable contacts 15 in response to certain characteristics of load current. The first trip unit includes a conventional thermal magnetic trip device 25 that actuates the operating mechanism 21 in response to short circuits and persistent overload conditions on the first line conductor 3, as is well known.

The first trip unit 23 further includes a first detector 27, which in the exemplary embodiment of the invention responds to arc faults associated with the first conductor 3 and to ground faults in the power distribution system 1. The first detector 27 has a first arc current sensor 29 formed by a first pair 31 of sensing wires 33 and 35 connected at spaced apart points 37 and 39, respectively, on the first conductor 3. Such a sensor measures the voltage drop across the known resistance of the conductor 3 between the points 37 and 39 for conversion by the first detector 27 to a current. Any of the many known types of arc fault detection schemes can be employed by the first detector 27 to analyze this current for arc faults. The exemplary detector 27 is of the type, such as that disclosed for example in U.S. Pat. No. 5,896,262, that bandpass filters the current detected in the conductor 3 to generate a pulse each time an arc strikes and generates a fault signal when a time attenuated accumulation of these pulses reaches a specified level.

The first trip unit 23 also includes a first ground current sensor in the form of a first sensing coil 41. The sensing coil 41 has a core 43 through which the first conductor 3, second conductor 5, and common neutral conductor 7 all pass as a one-turn primary winding. The current in each of these conductors induces a sensing current in the secondary winding 45. When there is no ground fault, the net current through the sensing coil 41 is zero and no ground current is input by the secondary winding 45 to the first detector 27. However, in the presence of a ground fault downstream, resultant current through the sensing coil 41 will be non-zero and a representation of the ground current will be provided through the secondary winding 45 to the first detector 27.

The first trip unit 23 further includes a first trip coil 47 and a first unidirectional switch 49, which in the exemplary embodiment is a silicon controlled rectifier (SCR). The first trip coil 47 and first unidirectional switch 49 are connected in series at a first node 51. The first trip coil 47 is connected to the common neutral conductor 7 while the cathode of the first unidirectional switch 51 is connected to the first line conductor 3.

The second pole 17 is similar to the first pole, and therefore, includes a second operating mechanism 53 for opening and closing the second separable contacts 19. A second trip unit 55 includes a second thermal magnetic trip device 57 and a second detector 59. This second detector 59, which is identical to the first detector 27, has a second arc current sensor 61, which in the exemplary embodiment, is a second pair 63 of sensing wires 65 and 67. This second pair of sensing wires 65 and 67 is connected at spaced apart points 69 and 71, respectively, on the second line conductor 5. A second ground current sensor in the form of a second sensing coil 73 also senses ground faults in the distribution system 1. In the exemplary embodiment, the second sensing coil 73 has a core 74 and can be housed in a common support 75 with the first sensing coil 41. Again, all three conductors 3, 5, and 7 pass through the core 74. The second secondary winding 76 provides a second ground current signal to the second detector 59. In the exemplary apparatus, the cores 43 and 74 are ferrite cores.

Finally, the second trip unit 55 includes a second trip coil 77 and second unidirectional switch 79 in the form of a second SCR. The second trip coil 77 and second unidirectional switch 79 are connected in series at the second node 81 with the second trip coil also connected to the neutral conductor 7 and the cathode of the second SCR 79 connected to the second line conductor 5. A jumper 83 directly connects the first node 51 and second node 81. No electrical isolation is needed because both coils are connected to the common neutral conductor 7 and the unidirectional switches 49 and 79 block current flow between the line conductors 3 and 5.

As the lengths of conductors 3 and 5, needed in order to have sufficient resistivity to generate a useable current reading, extend through the two coils 41 and 73, one of the sensing wires 35 and 65 for each of the sensors 29 and 61 is also passed through both coils 41 and 73 to cancel any effect the inductances of the coils might have on the sensed current.

When the first detector 27 detects either an arc fault or a ground fault, a first fault signal generated on the line 85 connected to the gate electrode of the first SCR 49 turns on this switch. Turn on of the SCR 49 energizes the first trip coil 47 to actuate the operating mechanism 21 and open first separable contacts 15. As the second trip coil 77 is also connected to the neutral conductor 7, it is also energized through the jumper 83 when the SCR 49 turns on so that the second separable contacts 19 are also opened.

In a similar manner, the second detector 59 generates a fault signal in response either to an arc fault detected through the second arc current sensor 61 or a ground fault detected through the second sensing coil 73 to generate a second fault signal which turns on the second SCR 79 through the lead 87. Again, turn on of this second SCR 79 energizes both of the trip coils 47 and 77 to open both circuit breaker poles. It should be noticed that even if one of the line conductors 3 or 5 is not energized, the corresponding separable contacts 15 or 19 will still be opened if the opposite pole detects an arc fault or ground fault.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for protecting an electric power distribution system comprising a first line conductor, a second line conductor, and a common neutral conductor, the apparatus comprising:
    a first circuit breaker pole comprising:
        first separable contacts connected in the first line conductor;
        a first arc fault detector generating a first fault signal in response to arc fault currents in the first line conductor; and
        a first trip unit comprising a first trip coil and a first unidirectional switch connected in series at a first node, with the first trip coil connected to the neutral conductor and the first unidirectional switch connected to the first line conductor, the first unidirectional switch being turned on by the first fault signal to energize the first trip coil and open the first separable contacts;
    a second circuit breaker pole comprising:
        second separable contacts connected in the second line conductor;
        a second arc fault detector generating a second fault signal in response to arc fault currents in the second line conductor; and
        a second trip unit comprising a second trip coil and a second unidirectional switch connected in series at a second node, with the second trip coil connected to the neutral conductor and the second unidirectional switch connected to the second line conductor, the second unidirectional switch being turned on the second fault signal to energize the second trip coil and open the second separable contacts; and
    a jumper connected at a first end to the first node and a second end to the second node to directly connect the first and second nodes without electrical isolation and so that the turn on of either one or both of the first unidirectional switch and the second unidirectional switch energizes both the first trip coil and the second trip coil to open both the first and second separable contacts.

2. The apparatus of claim 1 wherein the first circuit breaker pole further comprises a first ground fault detector generating the first fault signal to turn on the first unidirectional switch in response to a ground fault in the electric power distribution system, and the second circuit breaker pole comprises a second ground fault detector generating the second fault signal to turn on the second unidirectional switch in response to a ground fault in the electric power distribution system.

3. The apparatus of claim 2 wherein the first ground fault detector comprises a first sensing coil through which the first line conductor, the second line conductor and the common neutral conductor are all routed, and the second ground fault detector comprises a second sensing coil through which the first line conductor, the second line conductor and the common neutral conductor are all routed.

4. The apparatus of claim 3 wherein the first sensing coil and the second sensing coil are both supported on a common support.

5. The apparatus of claim 4 wherein the first and second sensing coils have air cores.

6. The apparatus of claim 3 wherein the first arc fault detector comprises a pair of first sensing wires connected at spaced points on the first line conductor with one sensing wire of the pair of first sensing wires extending through the first sensing coil, and wherein the second arc fault detector comprises a pair of second sensing wires connected at spaced points on the second line conductor with one sensing wire of the pair of second sensing wires extending through the second sensing coil.

7. The apparatus of claim 6 wherein the first and second unidirectional switches are silicon controlled rectifiers.

8. The apparatus of claim 1 wherein the first and second unidirectional switches are silicon controlled rectifiers.

9. A fault detector for an electric power distribution system comprising a first line conductor, a second line conductor and a common neutral conductor, the fault detector comprising:
- a first detector comprising:
    - a first arc current sensor sensing arc currents in the first line conductor;
    - a first ground current sensor comprising a first sensing coil through which the first conductor, the second conductor and the common neutral conductor are routed;
    - a first detector circuit responsive to arc currents from the first arc current sensor and to ground currents from the first ground current sensor to generate a first fault signal; and
    - a first trip circuit comprising a first trip coil and a first unidirectional switch connected in series at a first node, with the first trip coil connected to the common neutral conductor and the first unidirectional switch connected to the first line conductor, the first unidirectional switch being turned on by the first fault signal to energize the first trip coil;
- a second detector comprising:
    - a second arc current sensor sensing arc currents in the second line conductor;
    - a second ground current sensor comprising a second sensing coil through which the first line conductor, the second line conductor and the common neutral conductor are routed;
    - a second detector circuit responsive to arc currents from the second arc current sensor and to ground currents from the second ground current sensor to generate a second fault signal; and
    - a second trip circuit comprising a second trip coil and a second unidirectional switch connected in series at a second node, with the second trip coil connected to the common neutral and the second unidirectional switch connected to the second line conductor, the second unidirectional switch being turned on by the second fault signal to energize the second trip coil; and
- a jumper connected at a first end to the first node and at a second end to the second node to directly connect the first and second nodes without electrical isolation, and so that turn on of either or both unidirectional switches energizes both the first and the second trip coils.

10. The detector of claim 9 wherein the first arc current sensor comprises a first pair of sensing wires connected at spaced apart points on the first line conductor with one sensing wire of the first pair of sensing wires extending through the first sensed coil, and the second arc current sensor comprises a second pair of sensing wires connected at spaced apart points on the second line conductor with one of the second pair of sensing wires extending through the second sensing coil.

11. The detector of claim 10 wherein the first sensing coil and the second sensing coil are both supported a common support.

12. The detector of claim 11 wherein the first and second sensing coils have air cores.

13. The detector of claim 9 wherein the first and second unidirectional switches are silicon controlled rectifiers.

* * * * *